United States Patent
Bhakta et al.

(10) Patent No.: US 10,436,409 B2
(45) Date of Patent: Oct. 8, 2019

(54) METHODS AND APPARATUS FOR LIGHT EFFICIENT PROGRAMMABLE HEADLAMP WITH ANAMORPHIC OPTICS

(71) Applicant: Texas Instruments Incorporated, Dallas, TX (US)

(72) Inventors: Vikrant R. Bhakta, Dallas, TX (US); Alexander Lyubarsky, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/144,170

(22) Filed: May 2, 2016

(65) Prior Publication Data

US 2016/0347237 A1  Dec. 1, 2016

Related U.S. Application Data

(60) Provisional application No. 62/167,588, filed on May 28, 2015.

(51) Int. Cl.
*F21S 41/20* (2018.01)
*F21S 41/64* (2018.01)
(Continued)

(52) U.S. Cl.
CPC .......... *F21S 41/675* (2018.01); *F21S 41/255* (2018.01); *F21S 41/265* (2018.01); *F21S 41/285* (2018.01);
(Continued)

(58) Field of Classification Search
CPC ... F21V 5/00; F21V 1/00; F21V 11/00; G03B 21/26; G03B 21/28; G03B 21/14
(Continued)

(56) References Cited

U.S. PATENT DOCUMENTS 5,283,600 A    2/1994  Imai
6,483,641 B1 * 11/2002  MacAulay ........... G02B 21/006
                                                    359/368
(Continued)

FOREIGN PATENT DOCUMENTS

EP        0911666 A2    4/1999

OTHER PUBLICATIONS

Bhakta, et al.; "High resolution adaptive headlight using Texas Instruments DLP technology"; ISAL 2015 Proceedings of the 11th International Symposium on Automotive Lighting (Technische Universitat Darmstadt); Sep. 29-30, 2015; pp. 483-494; vol. 16; Herbert Utz Verlag GmbH; Munich, Germany.

*Primary Examiner* — Edwyn Labaze
(74) *Attorney, Agent, or Firm* — Michael A. Davis, Jr.; Charles A. Brill; Frank D. Cimino

(57) ABSTRACT

In described examples of a headlamp to project a beam of light from a lens, the headlamp includes: an illumination module to output a light beam to an illumination path; and illumination optics to receive the light beam and to provide illumination to a programmable spatial light modulator. The programmable spatial light modulator is arranged to receive the illumination and to output non-uniform illumination as patterned light to projection optics. The projection optics are arranged to receive the patterned light and to output the patterned light through the lens. At least one of the illumination optics and the projection optics includes an anamorphic lens to shape the light beam.

20 Claims, 12 Drawing Sheets

(51) Int. Cl.
*F21S 41/675* (2018.01)
*F21S 41/255* (2018.01)
*F21S 41/265* (2018.01)

(52) U.S. Cl.
CPC ........ *F21S 41/645* (2018.01); *B60Q 2400/50* (2013.01)

(58) Field of Classification Search
USPC .............. 362/520–521, 509, 308; 353/37–38
See application file for complete search history.

(56) References Cited

U.S. PATENT DOCUMENTS

| | | | |
|---|---|---|---|
| 7,188,984 B2 | 3/2007 | Sayers et al. | |
| 9,068,711 B2 | 6/2015 | Na et al. | |
| 2008/0151194 A1* | 6/2008 | Segev | G03B 21/26 353/28 |
| 2008/0239498 A1* | 10/2008 | Reynolds | H04N 9/3129 359/618 |
| 2010/0103380 A1* | 4/2010 | Destain | G02B 27/0994 353/37 |
| 2010/0110714 A1* | 5/2010 | Ookubo | F21S 48/1159 362/538 |
| 2010/0302803 A1* | 12/2010 | Bita | G02B 6/0036 362/606 |
| 2012/0140243 A1* | 6/2012 | Colonna de Lega | A61F 9/00836 356/609 |
| 2014/0002801 A1* | 1/2014 | Miura | H04N 9/3152 353/31 |
| 2015/0377446 A1 | 12/2015 | Bhakta | |
| 2016/0011523 A1* | 1/2016 | Singh | G01J 3/2823 355/77 |
| 2016/0347237 A1* | 12/2016 | Bhakta | F21S 48/1757 |

* cited by examiner

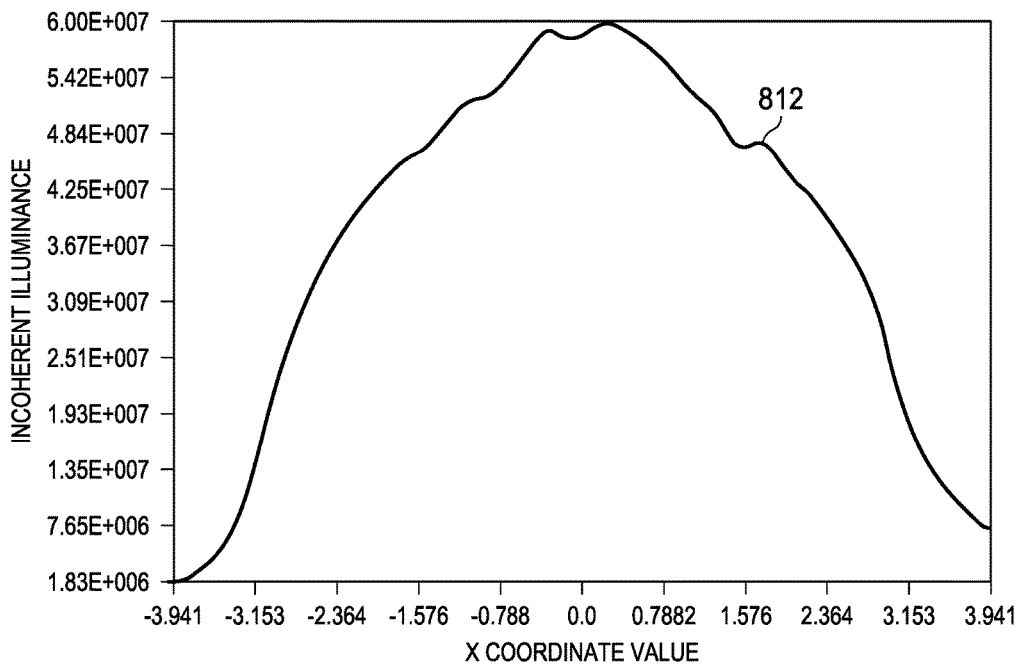
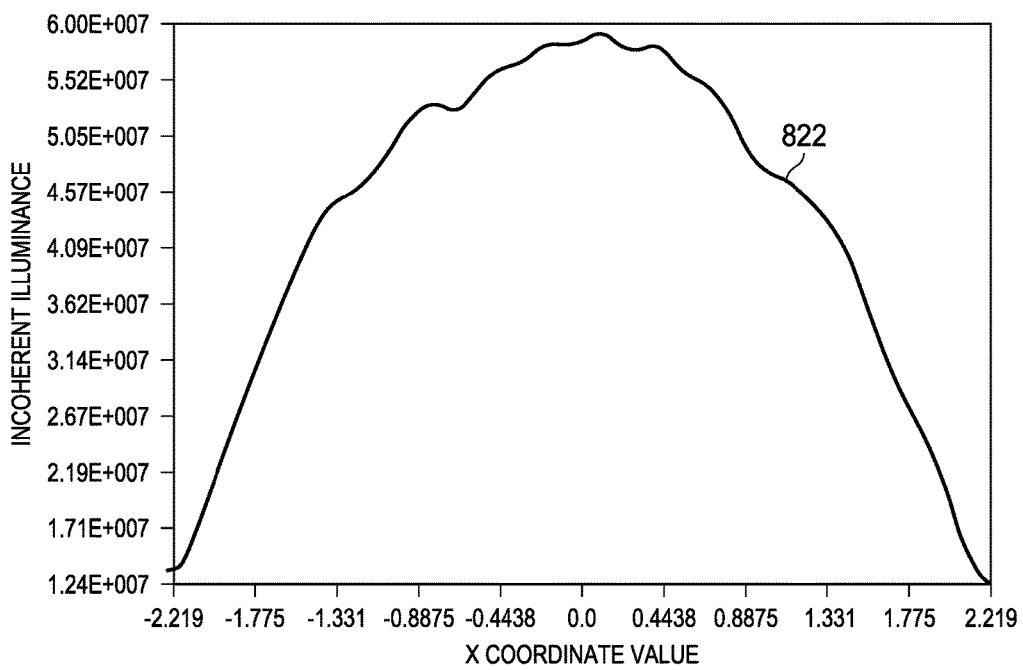

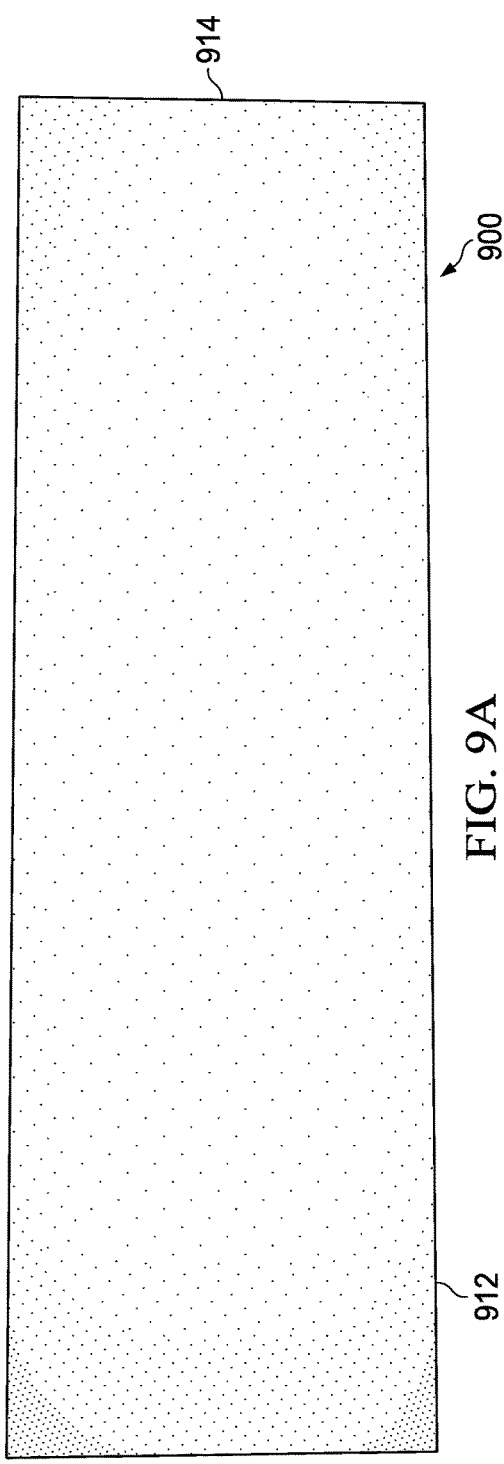
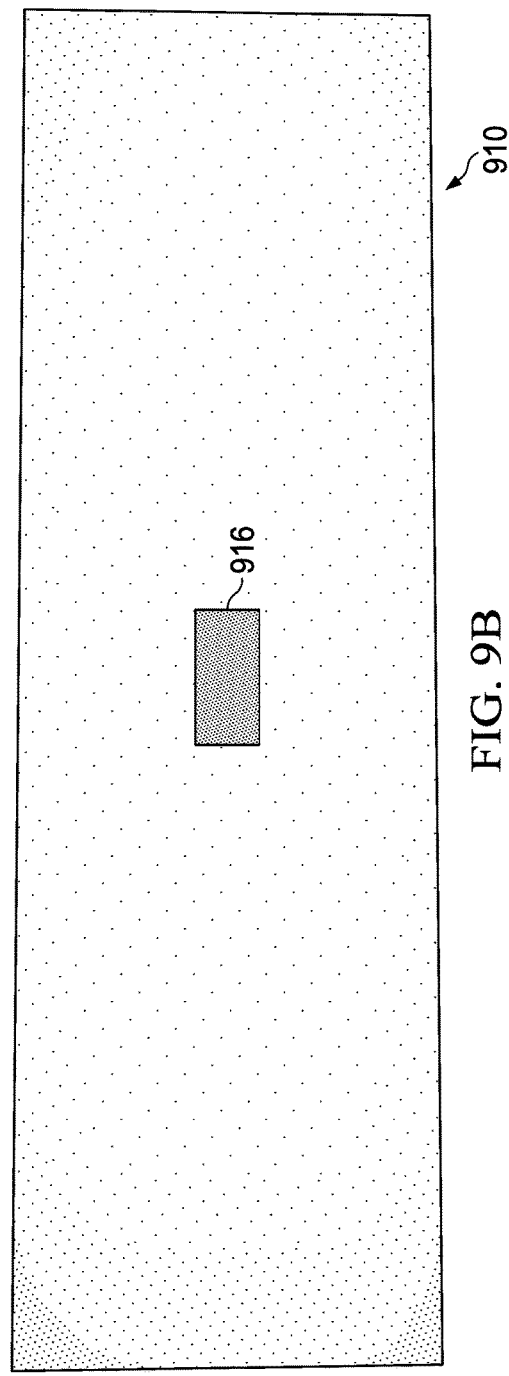
FIG. 9A
FIG. 9B

METHODS AND APPARATUS FOR LIGHT EFFICIENT PROGRAMMABLE HEADLAMP WITH ANAMORPHIC OPTICS

CROSS-REFERENCE TO RELATED APPLICATIONS

This application claims benefit of priority under 35 U.S.C. § 119(e) to U.S. Provisional Patent Application Ser. No. 62/167,588, filed May 28, 2015, entitled "ANAMORPHIC OPTICAL ARCHITECTURE FOR PROGRAMMABLE HEADLIGHT USING DMD," naming Vikrant R. Bhakta et. al. as inventors, which application is hereby incorporated by reference in its entirety herein.

TECHNICAL FIELD

This relates generally to headlamps, and more particularly to programmable headlamps with pixelated light beams.

BACKGROUND

Glare-free forward illumination has become an important goal to improve night driving safety for vehicles. Automotive headlamps with patterned beams have been proposed to dynamically illuminate the field of view. In some applications, the headlamp beam pattern may be modified based on data from a variety of sources, including forward looking sensors, indicators or beacons located on the roadway, with positional or traffic data from GPS receivers, or even attitude sensors. Headlamp systems using dynamic beam adaptation potentially enable a number of applications, such as: glare-free high beams; pedestrian face masking; animal spot lighting; target painting; reflection reduction; vehicle attitude compensation; adaptive front beam steering; and projecting information on the roadway.

U.S. Pat. No. 9,068,711 discloses glare free lighting with a low resolution pixel count, both vertically and horizontally. Although this low resolution approach can provide glare free masking, the coarse resolution may cause distraction to the driver. U.S. Pat. No. 7,188,984 discloses matrix type headlamps made with an array of LED sources, but the maximum pixel resolution shown in this arrangement is 25×30 (which amounts to 750 pixels), so this arrangement likewise has a relatively low resolution. With these low resolution approaches, a blanked area in the adaptive beam might appear to move jerkily or in jumps when viewed by the driver.

SUMMARY

In described examples of a headlamp to project a beam of light from a lens, the headlamp includes: an illumination module to output a light beam to an illumination path; and illumination optics to receive the light beam and to provide illumination to a programmable spatial light modulator. The programmable spatial light modulator is arranged to receive the illumination and to output non-uniform illumination as patterned light to projection optics. The projection optics are arranged to receive the patterned light and to output the patterned light through the lens. At least one of the illumination optics and the projection optics includes an anamorphic lens to shape the light beam.

BRIEF DESCRIPTION OF THE DRAWINGS

FIGS. 8A-8C are three graphs of light intensity data measured in the prototype headlamp of FIG. 6.

FIGS. 9A and 9B depict the output beam patterns observed from a light efficient programmable headlamp example.

DETAILED DESCRIPTION OF EXAMPLE EMBODIMENTS

Figure 1A:
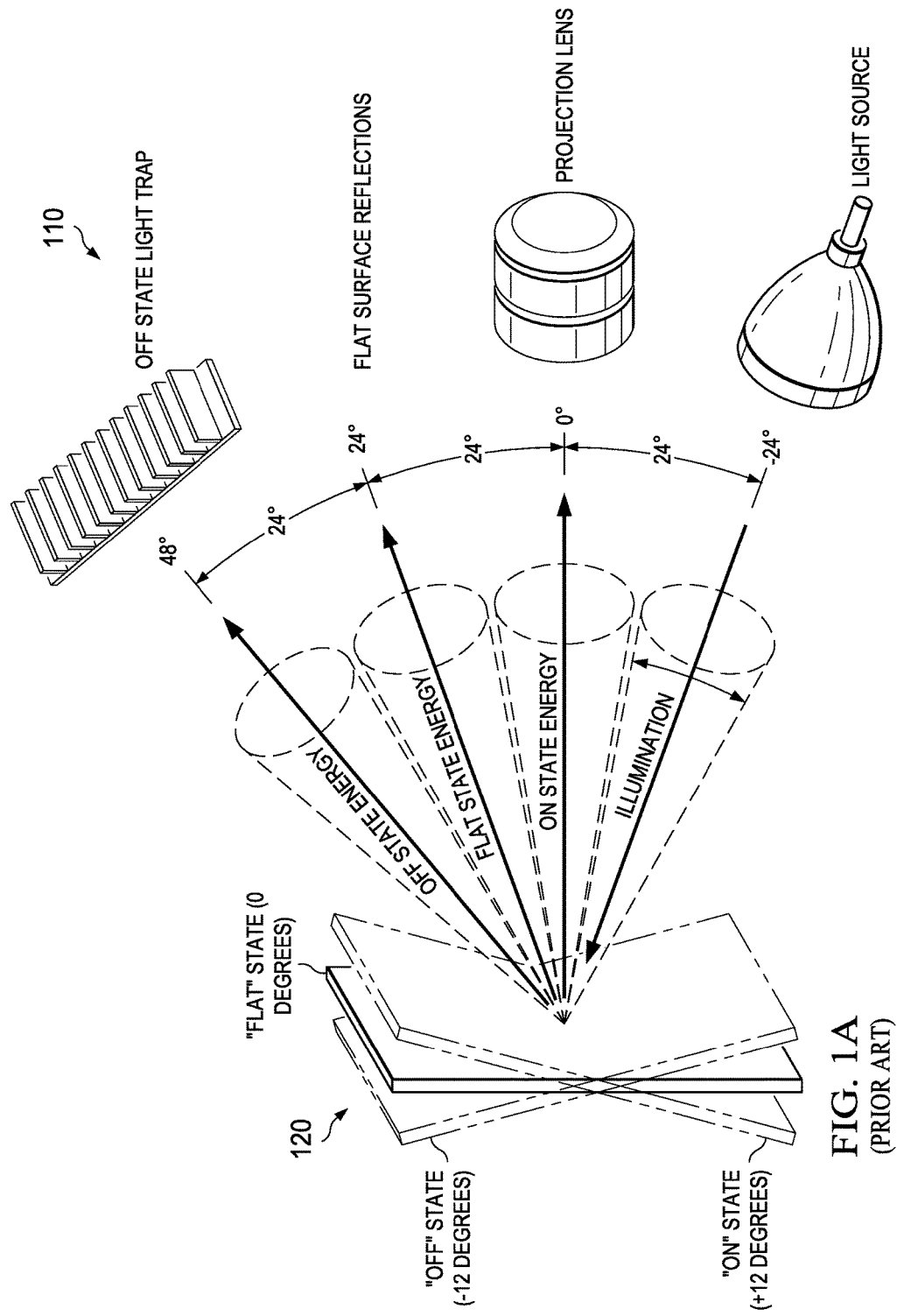
FIG. 1A illustrates light cone paths using a digital mirror device (DMD) to form a conventional video projection system.

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Current video projection system technologies generally include an incoming light beam that is pixelated by a spatial light modulator (SLM). The SLM technology enjoys relatively high resolutions (in comparison to older LED matrix solutions). For example, an automotive qualified WVGA SLM available from Texas Instruments Incorporated has a resolution of greater than 400,000 pixels. The most common video projection SLMs are LCD, DMD and LCoS technologies. The LCD (liquid crystal display) is a transmissive technology where light passes through a clear panel, and the undesired pixels are "shuttered" to block the light, allowing the rest of the light to continue through the projection system. The DMD (digital micro-mirror device) is a reflective technology where thousands of tiny moveable mirrors can be individually deflected. Using DMD technology, respective mirror angles of undesired pixels are changed to direct incoming light away from the projection path, so the primary stream of light may create a pixelated image. The LCoS (liquid crystal on silicon) and FLCos (ferroelectric liquid crystal on silicon) use an LCD type shutter mechanism backed by a reflective medium. The individual LCD elements can be used to shutter or pass light forming an image.

For conventional video projector systems, SLMs have native pixel sizes that match standard video sizes, such as SVGA @ 800×600 pixels, XGA @ 1024×768 pixels, WXGA @ 1280×720 pixels, and FHD @ 1920×1080 pixels. Although video formats continue to increase the pixel density, the general aspect ratio for video displays remains in the 1.5 to 1.77 range, with the most popular sizes WXGA and FHD both having an aspect ratio of 1:1.77 (often referred to more simply as 16:9).

An automotive headlamp application arranged with a conventional video projector SLM requires addressing an aspect ratio difference between video projection systems and headlamps. As described above, the aspect ratio of video SLMs is generally 16:9, and the aspect ratio remains the same in the next generation 4K UHD displays. Automotive headlamp applications require an aspect ratio of greater than 2:1, and even as high as 5:1. To use a video SLM in a headlamp application, a simple approach would limit the active pixels to only a portion of the SLM pixels, using only pixels that correspond to the final headlamp aspect ratio. This simple approach leads to a significant loss in brightness (low efficiency) and a loss in resolution, neither of which is desirable. Therefore, other solutions are needed to address these problems.

Automotive headlamp applications also change the light intensity profile characteristics needed (when compared to video projection systems). A video projection system projects substantially uniform lighting intensity across the visible display area. The uniformity is normally obtained using a light homogenizer or fly's eye array (FEA) to evenly distribute the light intensity. In contrast, a headlamp needs a center-peaked light intensity distribution and higher brightness in the center region, yet both of these characteristics are contrary to the use of light homogenizers or FEAs. A simple solution to achieving the center peaked distribution is to ignore a portion of the spatial light modulator, reducing the light by dithering the non-centered pixels. However, this approach results in wasted light and unacceptable lowered efficiency, which are undesirable for a headlamp application.

A headlamp design including video projection SLMs also needs to address the aspect ratio of automotive grade LED lighting arrays. Lighting arrays designed for automotive applications generally have an aspect ratio greater than 16:9, which is wider than the aspect ratio of video SLMs. This ratio difference results in an etendue mismatch in the optical illumination system and the SLM, again leading to an undesirable loss in brightness because some of the incoming illumination is not used in the output beam.

Example embodiments provide headlamps using SLMs to form adaptive beams. The example embodiments form efficient headlamps using spatial light modulators and anamorphic elements to efficiently capture light from an illumination system, to direct the light onto the spatial light modulator, and to efficiently project light from the spatial light modulator in an illuminating beam with an aspect ratio of greater than about two. In example embodiments, DMDs are used as SLMs to harness the advanced capabilities of high volume manufacture, to use the pixelated patterning the DMD provides, and to achieve cost effective, light efficient headlamps.

A review of a conventional projection system with a DMD as the spatial light modulator further illustrates the differences between a video projection architecture and the architecture for a headlamp arranged using an SLM. Although DMDs are shown as SLMs in certain examples described herein, various embodiments can use a variety of spatial light modulator devices.

Figures 1B, 2:
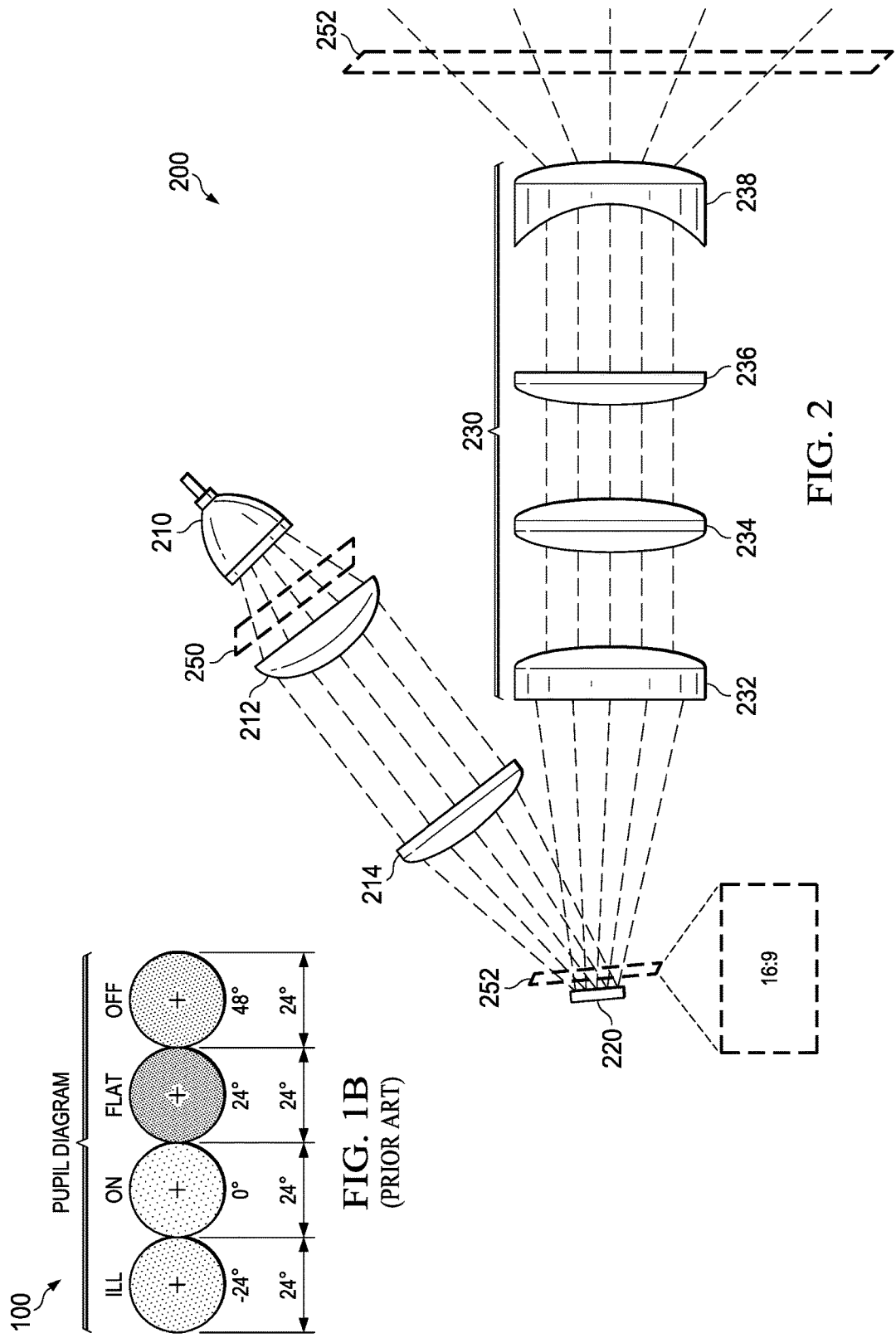
FIG. 1B illustrates a pupil diagram corresponding to the DMD and illumination system of FIG. 1A.
FIG. 2 illustrates an example headlamp.

FIG. 1A illustrates light cone paths in system 110 using a conventional digital mirror device (DMD) with a +/−12 degree tilt. In FIG. 1B, a pupil diagram 100 illustrates the four pupil positions usually found in a conventional DMD video projection system. The four pupil positions in the pupil diagram 100 are: (a) the illumination pupil (ILL), where an illumination source produces light directed towards the DMD; (b) the adjacent ON pupil, where the desired pixelated light is reflected by the DMD and passes through the projection lens; (c) the FLAT pupil, which is the position of the light beam when the DMD is unpowered (and the mirrors are not tilted); and (d) the last pupil (OFF), which is the pupil where undesired light is reflected, usually into a light trap that collects heat. The angular extent of each pupil in this illustrative example is 24 degrees, which allows for full separation of the pupils for a video projection system.

FIG. 1A depicts a portion of a simplified conventional video projector. For clarity, FIG. 1A shows only a single mirror of a DMD array. A conventional DMD array includes thousands or millions of mirrors that are individually addressed, and which are individually movable to deflect light, as shown by the three positions of representative mirror 120. When unpowered, the mirrors are in a "FLAT" position. In the FLAT position the deflection is 0 degrees from a line perpendicular to the unpowered surface. In the "ON" or "OFF" positions, the mirrors in this example conventional system deflect by +12 degrees or −12 degrees, respectively, from the unpowered FLAT position. Other tilt angles can be used, such as +/−17 degrees of tilt in some DMDs. In the simplified projector 110, a light source provides a beam of light, which is focused on the DMD by an illumination system. In a practical system, the illumination system includes collimating and focusing lens sets (not shown in FIG. 1A). The light beam forms a cone (light cone) as it is focused to the DMD. The DMD reflects some portion of the beam to the projection lens and the balance to the off state light trap. The individual mirrors, or pixels, are selected by image information that is provided to the DMD in the form of electronic image data from a video processor (not shown).

An example apparatus efficiently uses SLM hardware in a headlamp, such as SLM hardware that is mass produced for video display equipment. The various arrangements use at least one anamorphic lens to re-shape the aspect ratio of either the illumination light beam or a projection light beam to an aspect ratio that substantially (e.g., approximately) matches the aspect ratio of the SLM. After the light beam leaves the SLM, another anamorphic lens set can be used to reshape the light beam aspect ratio from the SLM to an aspect ratio greater than about two in the final projection of the light beam. The anamorphic optics within the light path maintain high levels of etendue while enabling a center peaked light distribution, which is desirable in headlamp systems. Light homogenizers are not required in the example embodiments, because a headlamp does not require uniform lighting, but instead works well with a non-uniform light intensity. By eliminating the homogenizers, the loss in brightness that accompanies use of homogenizers is avoided. The anamorphic elements create a high brightness by using all or almost all of the available illumination light, and the light directed to the spatial light modulator is efficiently reflected into the projection optics and forms a projected beam with a high intensity at the center of the field of view.

FIG. 2 illustrates an example headlamp 200. In FIG. 2, an illumination source 210 produces light, which is captured by a collection and collimation lens 212. The aspect ratio 250 of the light beam from the illumination is equal to or greater than an aspect ratio of the DMD. Properly matching the aspect ratio of the illumination to the DMD aspect ratio allows the illumination light to fully illuminate the DMD mirrors. The light beam from the lens set 212 travels to the beam shaping lens set 214, where it is focused on the surface of the DMD 220. The aspect ratio of video DMDs is usually 16:9 or 1.77:1. The light beam is then reflected from the DMD to the projection lens set 230, which in this example includes a doublet lens 232, a focusing lens 234, a cylindrical lens 236 and an anamorphic lens 238. The light beam exits the projection system 230 with a final aspect ratio of about 3.3:1 (shown as plane 252). In other examples, the final aspect ratio can be greater than about 2.

The light source 210 can produce white light using LEDs, but other white light sources are useful too. Alternatives include using a blue laser to excite a yellow phosphor, a halogen light, or an incandescent light. Further, the headlamp is useful as a booster to add driver information to the roadway by using white light or non-white light. Commonly, red light is used at night to prevent "night blindness," and green light is used to indicate a proper path or (in the case of a traffic signal) a confirmation to proceed. Further, in military applications, the headlamp may be used to illuminate targets with visible or infrared light, which appears invisible to the human eye. The use of the spatial light modulator enables additional information to be added to the light beam visible to the driver. For example, if the headlamp 200 is coupled to a GPS system, then the driver may see textual cues (such as "EXIT HERE" or "TURN LEFT") that aid in progressing along a route and can be projected on the roadway ahead of the next action. Further, if real time traffic information is available, the headlamp 200 can also add visual information about the upcoming road conditions by displaying textual messages (such as "TRAFFIC AHEAD, SLOW" or "STOP AHEAD"). These visual cues can include more than textual cues. For example, symbols (e.g., international traffic signals, such as curve symbols, stop signs, construction ahead, caution and similar symbols) can be displayed. Location information (such as "DAYTON OHIO 5 MILES" or "MILE MARKER 123") can be displayed in the forward beam in a manner that provides information to the driver without looking away from the roadway. Also, information (such as "GAS AHEAD" or "LODGING NEXT EXIT") can be displayed for enabling the driver to maintain attention on the roadway while still receiving these visual cues.

Beam shaping lens 214 can include an anamorphic lens. An anamorphic lens can preserve the etendue and brightness, while also reshaping the light beam aspect ratio 250 from the illumination source 210 to match or approximately match the aspect ratio 252 of the DMD 220. Also, the anamorphic lens 214 can concentrate the light intensity of the illumination source 210, forming a light beam with a non-uniform, center peaked distribution that travels to the DMD 220.

After the illuminating light beam is received and reflected by the DMD 220, according to image information supplied electronically to the DMD from an image projection circuit or chip, the patterned light beam enters the projection lens set 230 with the same or a similar aspect ratio 252 as the DMD 220. Anamorphic lens 238 can also reshape the light beam to meet the final aspect ratio shown as 252. The aspect ratio 252 is arranged for a headlamp application, while still preserving a center peaked light distribution.

In both of the anamorphic lenses 214 and 238, the respective focal lengths may be different along: (a) an X axis (Fx), which is usually a horizontal axis (although the lens can be rotated); and (b) an Y axis (Fy), which is usually a vertical axis. The relationship is defined by the following Equation (1):

$$\text{Anamorphism} = \frac{Fx}{Fy} = (Dh * \tan(V_{fov}))/(Dv * \tan(H_{fov})); \quad (1)$$

where: Dh and Dv are the horizontal and vertical sizes of the DMD respectively; and $V_{fov}$ and $H_{fov}$ are the incoming or outgoing vertical and horizontal fields of view.

The light cone spacing of FIG. 1A is arranged for an illumination source that will physically fit within the 24° window shown for a video projection system. However, industry qualified headlamp LED sources usually have a wider aspect ratio. This larger aspect ratio beam requires a wider pupil and a larger lens to capture all of the available light beam for preserving etendue and brightness. F-number is a parametric term for the ratio between the focal length of a lens divided by the diameter of the lens. Given a fixed focal distance, a lens that is larger in diameter covers a wider field of view and will result in a smaller F-number. A lower F-number lens is required for a larger aspect ratio illumination source. Although the lower F-number lens enables higher brightness, the increased brightness comes at the expense of a lower contrast ratio. However, this lowered contrast ratio is still acceptable for headlamp applications.

Figure 3:
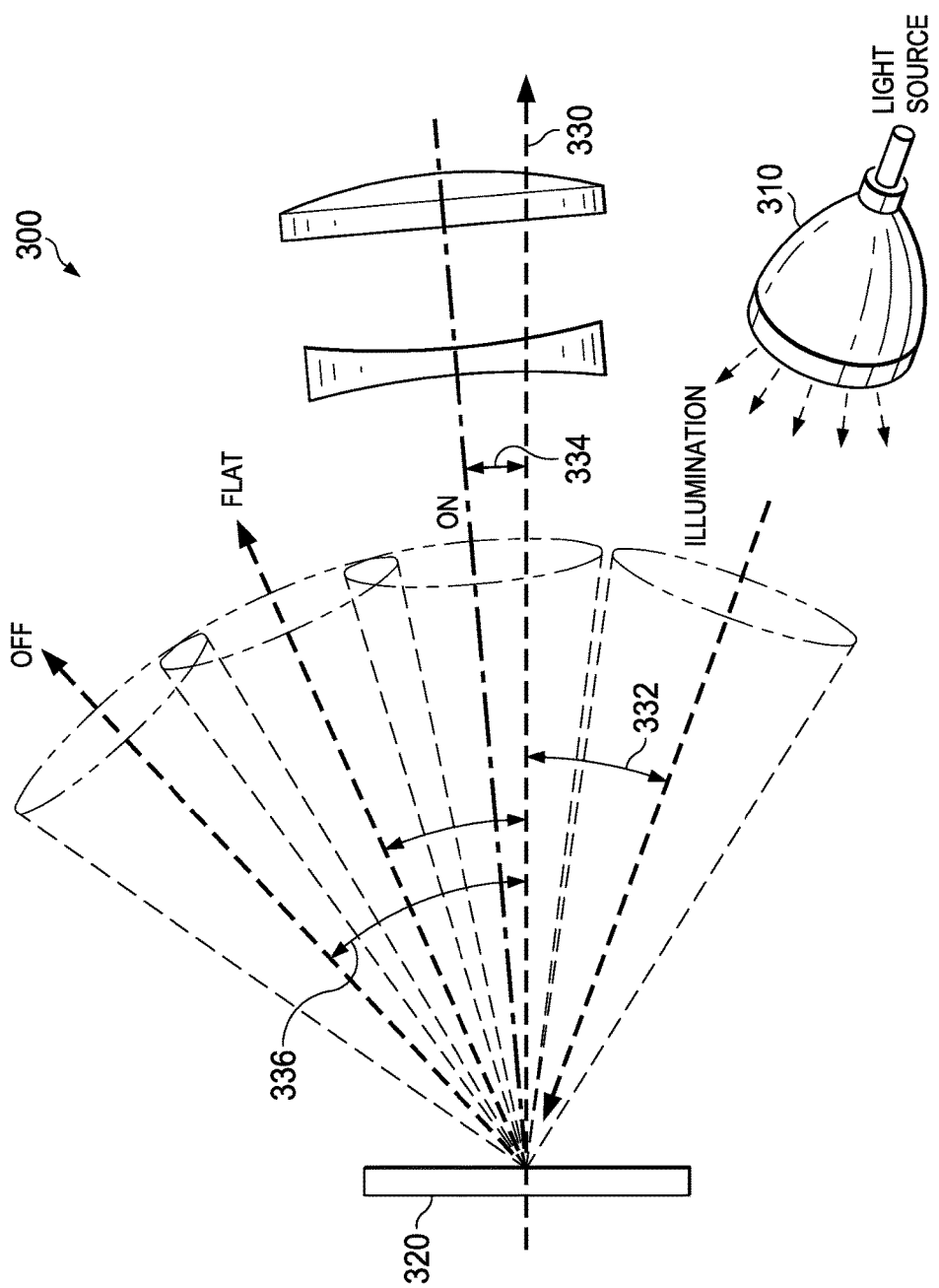
FIG. 3 illustrates an example of light cone spacing.

FIG. 3 illustrates an example of the light cone spacing for another headlamp 300 using a DMD. In alternative embodiments, the system 300 can be implemented using other SLMs, such as an LCoS SLM. The light cone arrangement of FIG. 3 illustrates a DMD 320 and four light cone positions, which are: ILL, ON, FLAT and OFF. The four light cone positions in FIG. 3 are for a headlamp illumination source 310, which has a pupil separation that differs from the conventional 24° space allocated for a video projector configured with a conventional 12° tilt DMD. The angle of incidence θinc in the system 300 is increased to reduce the cone overlap that occurs due to the F/#, which is faster than the typical F/2.4 F#. The angle of incidence θinc (labelled 332) is measured from the line 330 (which is perpendicular to the flat state of the DMD mirrors) to the illumination axis of the light source 310.

θinc is defined by the following Equation (2):

$$\theta\text{inc} = 2*\sin^{-1}[(\tfrac{1}{2} * F\#\text{is})] \quad (2)$$

where F#is=F-number for the illumination source lens.

With the angle of incidence 332 determined, the projection axis angle 334 is defined by the following Equation (3):

$$\text{Angle 334} = (\theta\text{inc 332}) - (2*\text{DMD tilt angle}) \quad (3)$$

where DMD tilt angle=12 degrees in this example.

And the OFF axis angle 336 is defined by the following Equation (4):

$$\text{OFF axis angle 336} = (\theta\text{inc 332}) + (2*\text{DMD tilt angle}) \quad (4)$$

Figure 4B:
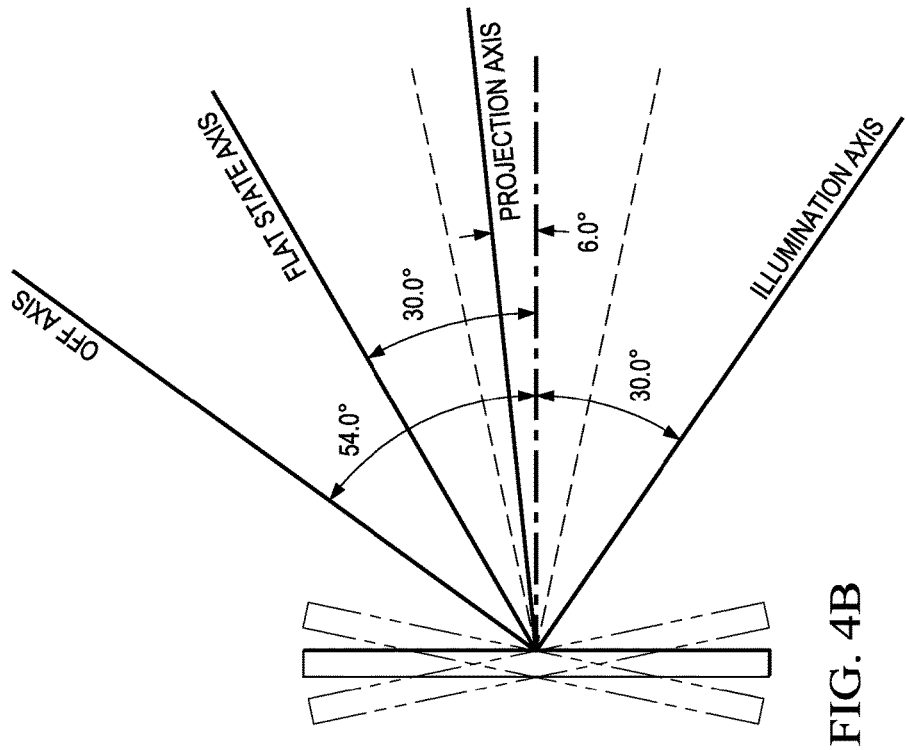
FIGS. 4A and 4B illustrate two angle of incidence examples.
Figure 4A:
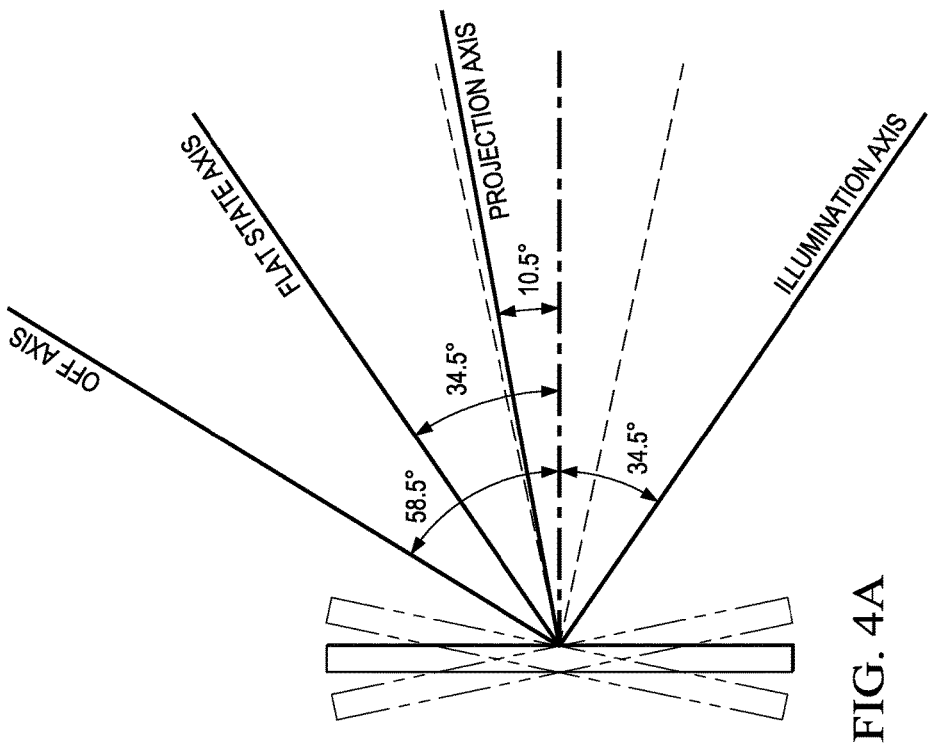

FIGS. 4A and 4B illustrate two angle of incidence examples, showing the various other angles that result. In FIG. 4A, the angle of incidence is 34.5 degrees. The angle from a horizontal plane to the projection axis is 10.5 degrees. The FLAT axis and the OFF axis are also shown. In another alternative embodiment, FIG. 4B illustrates an angle of incidence AOI of 30 degrees. The projection axis angle to a horizontal plane is 6 degrees. The tilt angle of the DMD devices in these examples is +/−12 degrees. DMD devices with a +/−12 degree tilt angle are available from Texas Instruments Incorporated, such as the DLP3000 device that has a +/−12 degree tilt angle with over 415000 mirrors. Another DMD device currently available from Texas Instruments Incorporated is the DLP2010 device, which has a +/−17 degree tilt angle with over 400000 mirrors. Alternative arrangements can be formed using other DMD devices with differing tilt angles, and by using other spatial light modulators, such as LCoS spatial light modulators. An example system can be arranged using a Texas Instruments Incorporated "tilt and roll pixel" (TRP) DMD, which has a compound motion around an axis. A TRP DMD can be illuminated from a first illumination source placed to one side of the DMD array, and by a second illumination source placed below the array, to direct light to the two tilted positions. For example, the DLP2010 device (mentioned above) is a TRP DMD device.

A general statement of the angle of incidence in relation to the tilt angle and the F# can be expressed as the following Equation (5):

$$\text{Angle of incidence } \theta inc = \text{MAX}\left[[2*\text{tilt angle}], 2*\sin^{-1}\left[\frac{1}{2*F_{num}}\right]\right] \quad (5)$$

where: tilt angle is the tilt angle for the selected DMD; and Fnum is the F-number along either the horizontal axis that is used for side illumination or the vertical axis that is used for bottom illumination.

Figure 5:
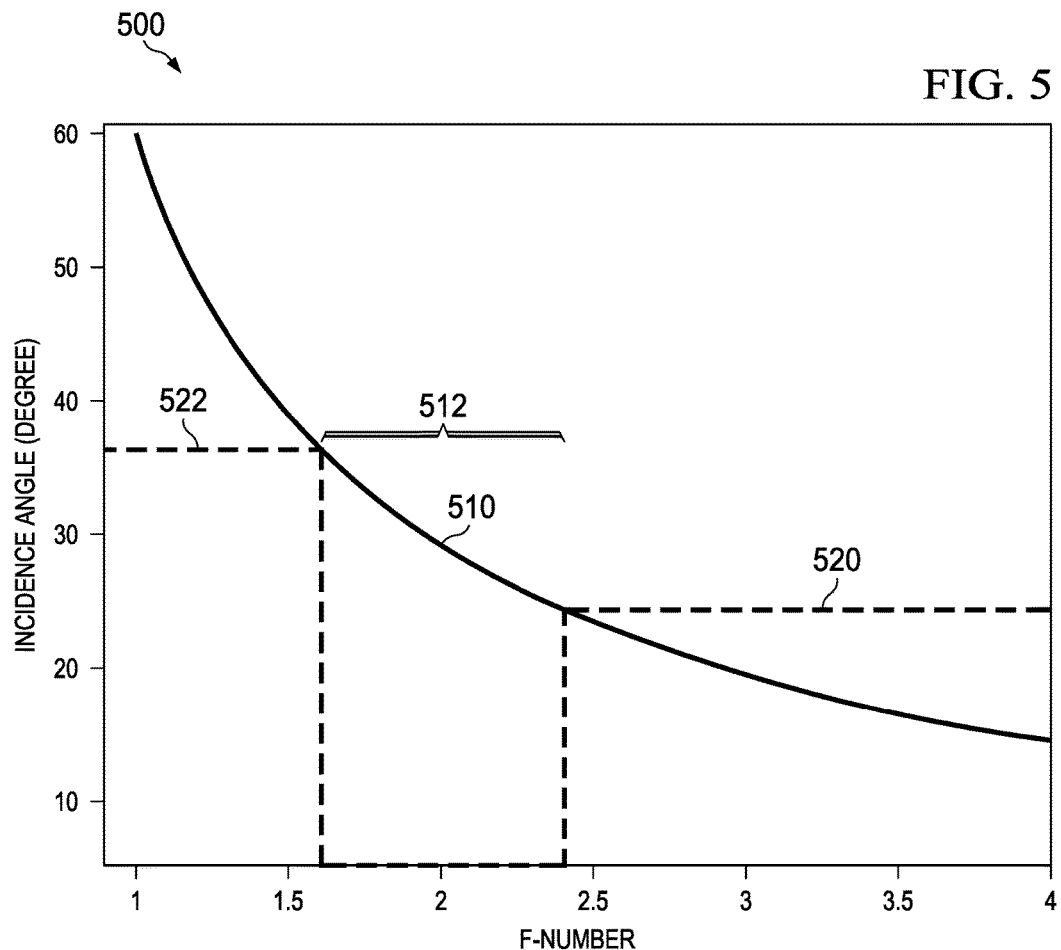
FIG. 5 is a graph indicating the range of F-number lenses applicable for an example DMD projection system.

A range of F-numbers of a lens (which can be used in example embodiments) corresponds to physical characteristics of the DMD projection system's components. FIG. 5 is a graph indicating the range of F-number lenses applicable for an example DMD projection system. In graph 500, the data line 510 shows the relationship between the angle of incidence and the required F-number of a lens to capture the light beam of a DMD projection system. By reflecting the angular limits to the F-number axis, a range 512 is indicated of F-numbers from about 1.7 to 2.4, where: 2.4 corresponds to a video projection system; and 1.7 corresponds to a headlamp system. This range of F-numbers is a typical range, but example embodiments can include an F-number as low as F/1.5 in a headlamp application with lower contrast requirements. In another alternative arrangement, the F-number could be increased to F/2.8, F/3.0 or higher. The higher F-number lens is particularly appropriate in an application using a low etendue and high luminance illumination source, such as a laser illumination source.

Figure 6:
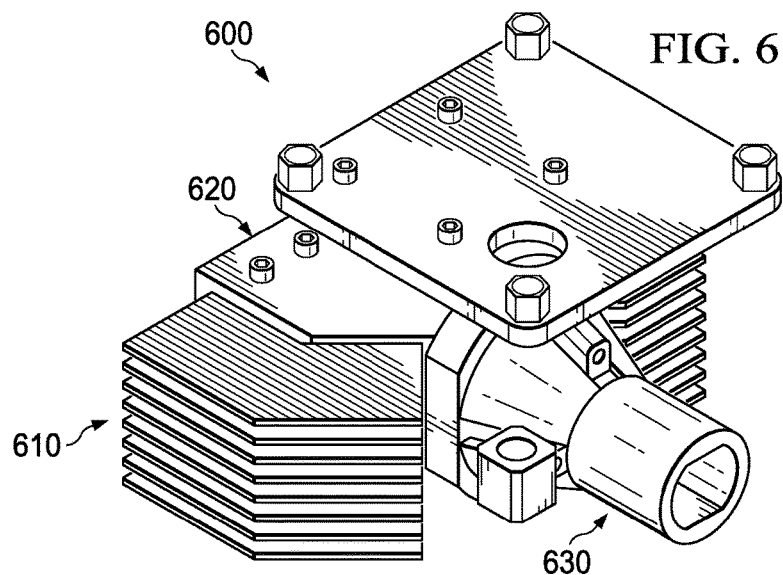
FIG. 6 depicts a prototype light efficient programmable headlamp.

FIG. 6 shows a prototype light efficient programmable headlamp 600. The headlamp 600 includes: a source illumination module 610; a 0.3" WVGA DMD 620 (not shown in the view of FIG. 6) from Texas Instruments Incorporated that is used as the SLM; and a projection lens set 630, including at least one anamorphic lens to reshape the light beam.

Figure 7:
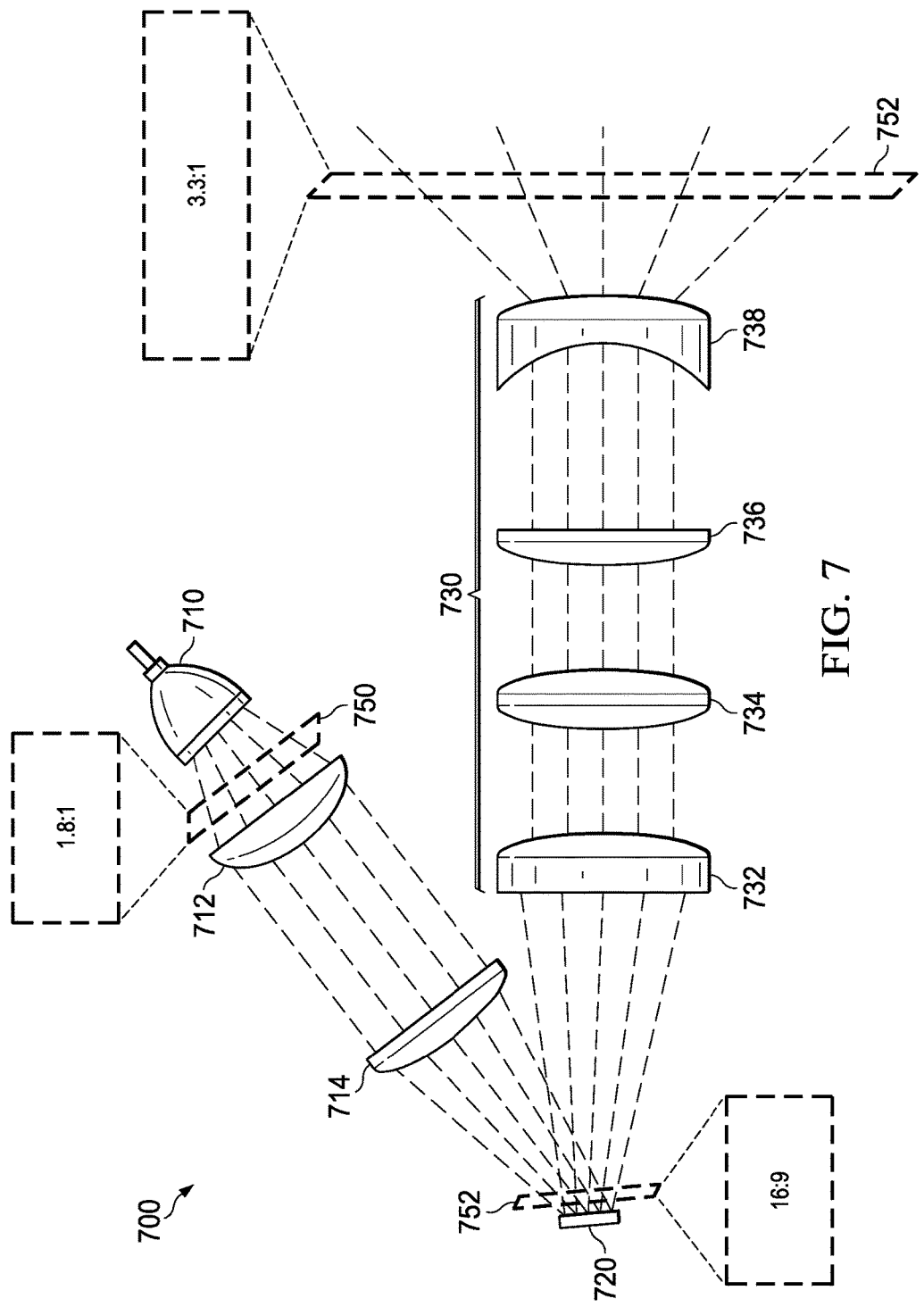
FIG. 7 is a block diagram of an example architecture in the prototype headlamp of FIG. 6.

FIG. 7 shows an example architecture in the prototype headlamp of FIG. 6. In FIG. 7, an LED illumination source 710 produces light, which is captured by the collection and collimation lens set 712. The aspect ratio 750 of the illumination light beam is 1.8:1 in this prototype headlamp. The light beam from the lens set 712 travels to the beam shaping lens set 714, where it is focused to the surface of the DMD 720. The aspect ratio of the automotive qualified DMDs is 16:9 or 1.77:1. In this example, no attempt was made to capture the edge overfill losses of the light beam reflecting off the DMD. However, additional light can also be captured with a lens, such as an anamorphic lens, and focused on the DMD array to increase the brightness of the light beam. The desired light beam is then reflected from the DMD 720 to the projection lens set 730, which includes: a doublet lens set 732, 734; a cylindrical lens 736; and an anamorphic lens 738. Projection lens set 730 is arranged to stretch the aspect of the light beam in a light efficient manner to preserve brightness. The light beam exits the projection lens set 730 to the path ahead with a final field of view of 20°×6° resulting in an aspect ratio (shown in dashed plane 752) of about 3.3:1. In other examples, the aspect ratio of the light beam exiting the projection lens set can be about 2:1 or higher.

Figure 8A:
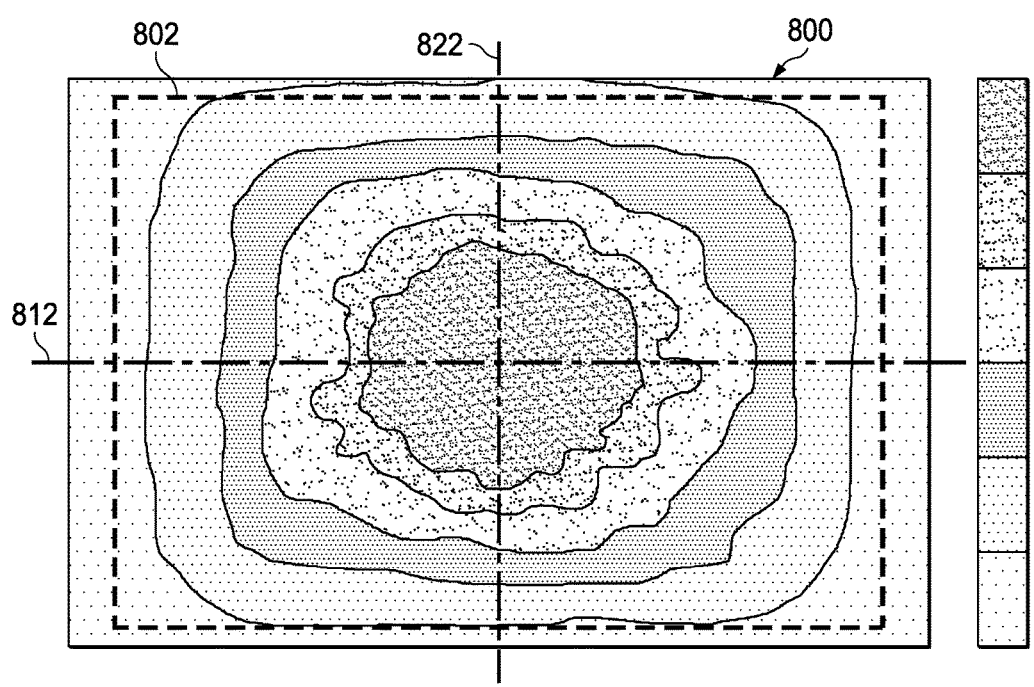

FIGS. 8A-8C are three graphs of light intensity data measured from the DMD in the prototype headlamp of FIG. 6. FIG. 8A is a light intensity graph 800, which has length on both X axis and Y axis. Graph 800 has increasing intensity towards the top of the scale. The DMD aspect ratio is indicated by the dashed line 802, illustrating about 10% overfill. The intensity of the light on the edges is sufficiently low to achieve a negligible loss of light in the 10% area. Lines 812 and 822 on graph 800 indicate where respective horizontal and vertical intensity measurements were recorded.

FIG. 8B is a graph 810 of light intensity along the vertical (Y) axis, with increasing value moving up from the origin. A distance value is shown on the horizontal (X) axis, with the zero point being in the center of the graph 810. The center of graph 810 corresponds to center line 822 on graph 800, which is in the center of the horizontal side of the DMD array. Data line 812 in FIG. 8B corresponds to the light intensity across line 812 on graph 800 in FIG. 8A. Data line 812 in FIG. 8B therefore shows that the center region (around 0.0 on the X axis) exhibits the highest light intensity.

FIG. 8C is a graph 820 of light intensity along the vertical (Y) axis, with increasing value moving up from the origin, and shows a distance value along the horizontal (X) axis, with the zero point being in the center of the graph. The center of the X axis in graph 820 corresponds to center line 812 on graph 800 in FIG. 8. Accordingly, the center of graph 820 indicates the intensity in the center of the vertical side of the DMD array. In FIG. 8C, data line 822 indicates the light intensity corresponding to line 822 on graph 800 in FIG. 8A. Data line 822 in FIG. 8C illustrates that the center region exhibits the highest intensity. The two measurements 812 and 822 confirm the non-uniform illumination of the DMD, which is described as "center peaked" intensity.

FIGS. 9A and 9B depict the output beam patterns observed from a light efficient programmable headlamp example. In FIG. 9A, pattern 900 shows a fully "ON" light beam sample of prototype projector 600 of FIG. 6. The horizontal field of view 912 is about 20° and the vertical field of view 914 is about 6°, for an approximately 3.3:1 aspect ratio. In FIG. 9B, a pattern 910 illustrates the same headlamp, but with a rectangular portion 916 of the image blanked out. Various beam patterns can be adaptively formed by forming patterns on the SLM, including patterns for glare free headlights where the beam is directed away from drivers in oncoming traffic, pedestrians, sidewalks or road shoulders. Unlike conventional "dimmed" headlamps, the headlamps of example embodiments have glare free operation, which allows increased brightness of light available to the driver while avoiding the glare and blinding problems of conventional "high beam" (or high brightness) lights.

Figure 10A:
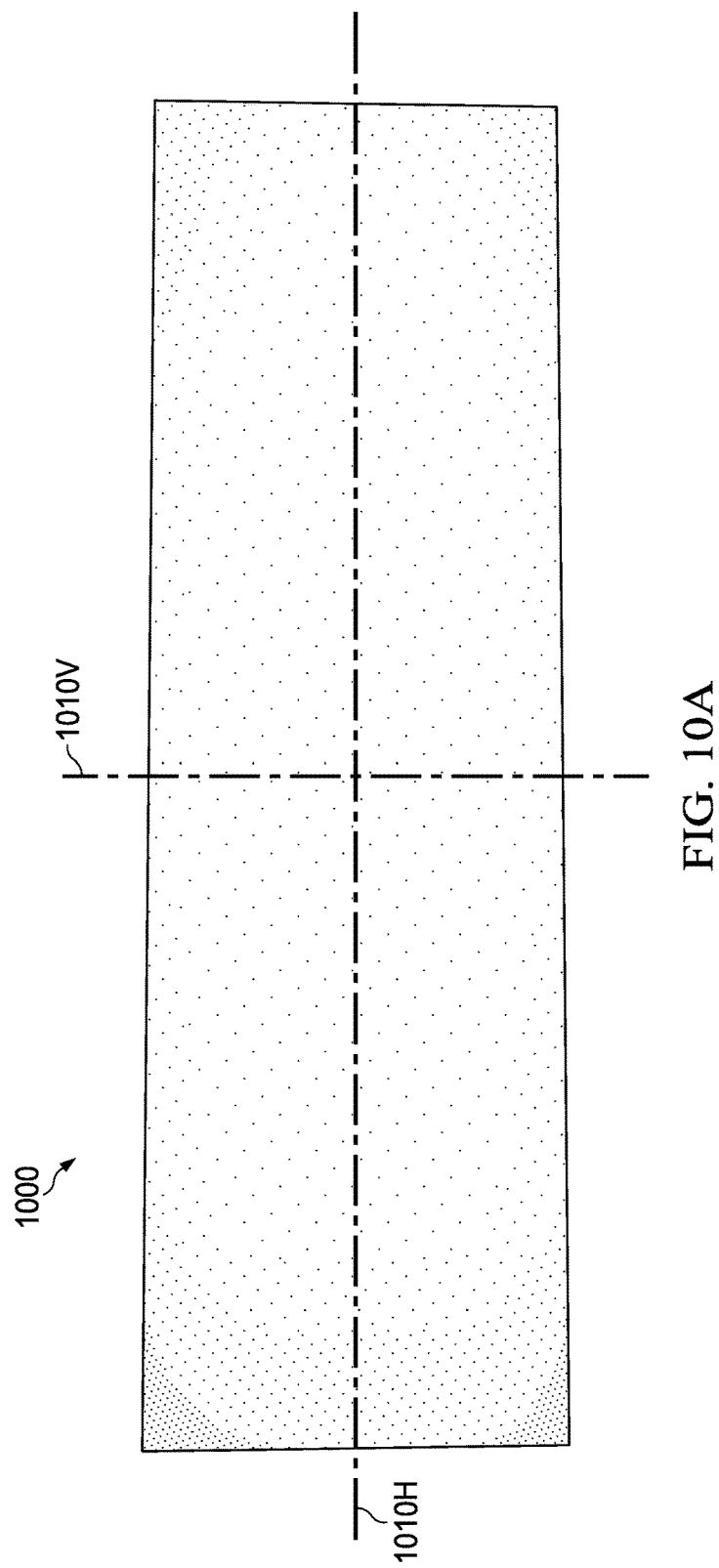
FIG. 10A illustrates a pattern of a light beam output from light efficient programmable headlamp examples.
Figure 10B:
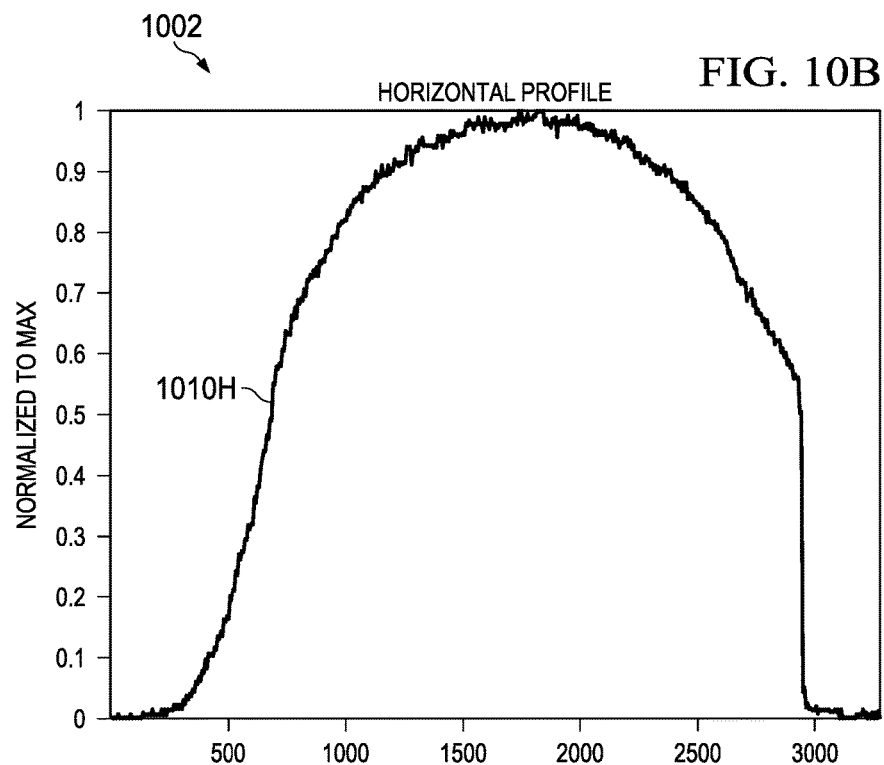
FIGS. 10B and 10C are two graphs of measured light intensity for the pattern of FIG. 10A.
Figure 10C:
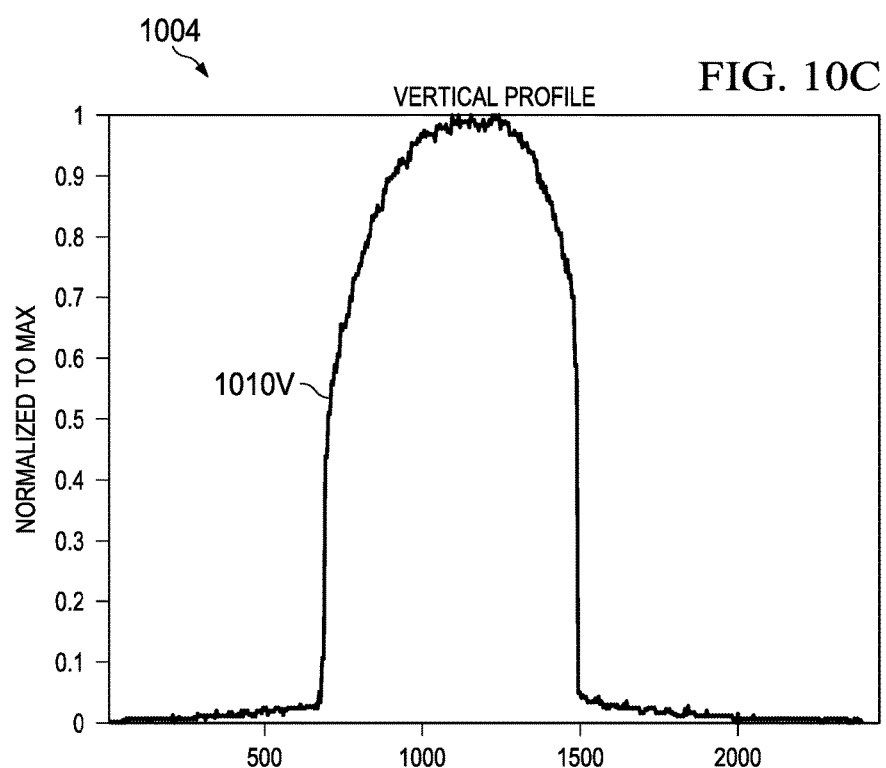

FIG. 10A depicts a pattern of a light beam output from the light efficient programmable headlamp examples described above. FIGS. 10B and 10C are two graphs of measured light intensity for the pattern of FIG. 10A. Pattern 1000 in FIG. 10A shows a fully "ON" light sample of prototype projector 600 of FIG. 6. Light intensity measurements were recorded along the vertical axis 1010V and along the horizontal axis 1010H. FIG. 10B shows a graph 1002, with relative intensity on the vertical axis and length/distance along the horizontal axis. The data line 1010H is the light intensity measured along the horizontal line 1010H in the pattern 1000. The data on the vertical axis is normalized to the peak intensity, so that "1" is the maximum value. Graph 1002 shows that the light intensity is non-uniform along the horizontal axis, with the light beam's center portion having the highest intensity. FIG. 10C shows a graph 1004 with: relative intensity on the vertical axis; and length/distance along the horizontal axis. The data line 1010V is the light intensity measured along the vertical line 1010V in pattern 1000. The data on the vertical graph axis is normalized to the peak intensity. Graph 1004 shows the light intensity is non-uniform along the vertical line, with the light beam's center portion having the highest intensity.

Light beams output by example embodiments (including at least one anamorphic lens and a spatial light modulator) result in about a 40% brighter center peak when compared to a headlamp that includes a conventional standard projection lens. The combination of data from both graphs 1002 and 1004 shows the highest intensity in the center of the beam, illustrating that example embodiments provide the "center peaked" non-uniform lighting intensity, which is desirable for headlamp applications.

Figure 11:
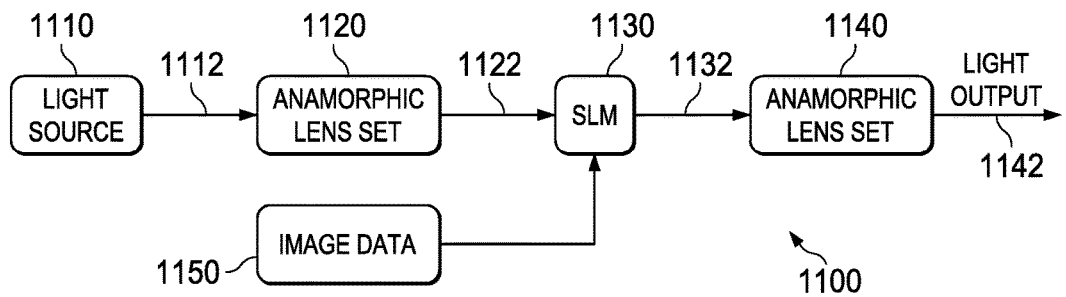
FIG. 11 is a simplified block diagram of a headlamp using anamorphic lens arrangements of example embodiments.

FIG. 11 is a simplified block diagram of a headlamp 1100 using the anamorphic lens arrangements described above. In FIG. 11, light source 1110 outputs an illumination light beam 1112. The illumination light beam is received by anamorphic lens set 1120, which outputs a non-uniform illumination 1122 with an aspect ratio that matches or nearly matches an aspect ratio of the spatial light modulator 1130. A reflected light beam 1132 is then directed from the spatial light modulator 1130 into a second anamorphic lens set 1140. The light output 1142 has a center peaked light beam with an aspect ratio that is greater than about 2. A video image processing system 1150 outputs image data, which can provide beam shaping and adaptive beam patterning by controlling the individually addressable pixels in the spatial light modulator 1130.

Figure 12:
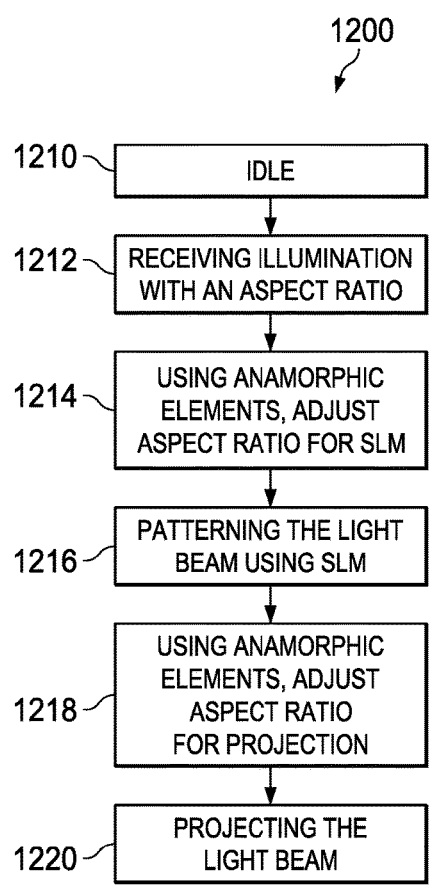
FIG. 12 is a flow diagram of a method of example embodiments.

FIG. 12 is a flow diagram 1200 of a method of example embodiments. In FIG. 12, the method begins at a step 1210, IDLE. At a step 1212, illumination is received with an aspect ratio that is different from the aspect ratio of the spatial light modulator. At a step 1214, anamorphic elements receive the illumination and adjust the aspect ratio to approximately match the aspect ratio of the spatial light modulator. At a step 1216, the light is received by a spatial light modulator and is patterned using the SLM and video input data. At a step 1218, the patterned light from the spatial light modulator is received by projection optics including an anamorphic element. The light beam has the aspect ratio modified by the anamorphic element for projection. At a step 1220, the center peaked light beam (including any patterning done at the SLM) is projected from the system.

Although examples described hereinabove are for automotive headlamps, additional applications include a flashlight, spotlight or headlight. Headlamps for any vehicle (such as an airplane, boat, snowmobile, helicopter, drone, construction equipment, farm equipment) can be formed including the arrangements of example embodiments. Lighting (such as security lights, spotlights, searchlight, path lighting and other indoor and outdoor lighting systems) can incorporate example embodiments. In addition to lighting for visibility, night vision systems can incorporate example embodiments, using infrared and near infrared illumination with the anamorphic elements. Adaptive beam shaping is useful with camera sensors to identify other vehicles, pedestrians, animals and other features and to automatically compensate the beam shape to form glare free headlamps.

In some example embodiments, headlamps have spatial light modulators to provide the light. In other example embodiments, supplementary high beam lights (e.g., formed using conventional headlights) and supplementary low beam or fog lights (e.g., also formed using conventional headlights) can be added to the headlamp arrangements to further form the light beam.

Example embodiments and arrangements form light efficient headlamps. Some example embodiments incorporate commercially available spatial light modulators with adaptive beam capabilities to form center peaked illumination beams for high visibility and glare free headlamps.

Accordingly, in described examples of a headlamp arranged to project a beam of light forward from a lens, the headlamp includes: an illumination module configured to output a light beam to an illumination path; and illumination optics configured to receive the light beam and configured to provide non-uniform illumination to a programmable spatial light modulator. The programmable spatial light modulator is arranged to receive the non-uniform illumination and to output the non-uniform illumination as patterned light to projection optics. The projection optics are arranged to receive the patterned light and to output the patterned light through the lens. At least one of the illumination optics and the projection optics includes an anamorphic lens to shape the light beam.

In a further example, the illumination optics include at least one anamorphic element, where respective focal lengths measured along a vertical axis and a horizontal axis are different. In another example, the projection optics include at least one anamorphic element, where respective focal lengths measured along a vertical axis and a horizontal axis are different.

In some examples, the programmable spatial light modulator includes a digital micro-mirror device (DMD), a liquid crystal on silicon device (LCoS) or a liquid crystal display (LCD).

In at least one alternative, the illumination module is arranged to output a light beam with an aspect ratio greater than or equal to an aspect ratio of the spatial light modulator. In another example, the projection optics are arranged to output a light beam with an aspect ratio greater than or equal to an aspect ratio of the spatial light modulator.

In yet another example, the illumination source supplies white light, non-white light or infrared light. In a further example, the headlamp is arranged to output light having a non-uniform light beam profile with a light intensity that is center peaked, and which decreases monotonically away from the center. In another alternative, the projection optics are arranged to have vertical and horizontal F-numbers within a range from about 1.2 to about 2.8.

In at least one example, the illumination module is arranged to output the light beam with an aspect ratio that is approximately the same as an aspect ratio for the spatial light modulator. In some examples, the illumination module includes an LED, a laser, a laser configured to illuminate a phosphor, or an incandescent light. In another example, the SLM includes a DMD. In a further example, the angle of incidence of the illumination light on the DMD is defined by: angle of incidence=MAX 〚 2*tilt angle of DMD in degrees, 2〚 sin 〛^(−1)〛[1/(2F_num)]], where the F_num for the horizontal axis is used for side illumination, and the F_num for the vertical axis is used for bottom illumination.

In yet another example, the tilt angle of the DMD is 12 degrees. In a further example, the tilt angle of the DMD is 17 degrees.

An example method includes: receiving a light beam with an aspect ratio greater than the aspect ratio of a spatial light modulator; outputting a non-uniform light beam with an aspect ratio to match the aspect ratio of the spatial light modulator; receiving the non-uniform light beam, and reflecting and pixelating the non-uniform light beam; receiving the pixelated light beam from the spatial light modulator into projection optics; and outputting the pixelated light beam from the projection optics. The pixelated light beam has an aspect ratio greater than an aspect ratio of the spatial light modulator.

In another example, a method includes pixelating the non-uniform light beam, and using patterns placed on pixel elements of the spatial light modulator to pattern the non-uniform light beam. In at least one alternative, outputting the non-uniform light beam includes using an anamorphic optical element disposed between a light source and the spatial light modulator. In another alternative, outputting the pixelated light beam from the projection optics includes operating an anamorphic optical element disposed within the projection optics.

In another example, the illumination provided by the illumination optics is non-uniform illumination, and the programmable spatial light modulator is arranged to receive the non-uniform illumination and to output the non-uniform illumination by reflecting the non-uniform illumination as patterned light to projection optics. In a further example, the headlamp is an automotive headlamp.

Modifications are possible in the described embodiments, and other embodiments are possible within the scope of the claims.

What is claimed is:

1. A headlamp, comprising:
an illumination module configured to output a light beam;
illumination optics optically coupled to the illumination module, the illumination optics configured to receive the light beam and to output non-uniform illumination;
a programmable spatial light modulator optically coupled to the illumination optics, the programmable spatial light modulator configured to receive the non-uniform illumination and to output non-uniform patterned light; and
projection optics including a lens, the projection optics optically coupled to the programmable spatial light modulator, and the projection optics configured to receive the non-uniform patterned light and to output the non-uniform patterned light through the lens;
at least one of the illumination optics or the projection optics including an anamorphic optical element, the anamorphic optical element configured to shape at least one of the non-uniform illumination or the non-uniform patterned light.

2. The headlamp of claim 1, wherein the illumination optics include the anamorphic optical element, the anamorphic optical element has a first focal length along a vertical axis and a second focal length along a horizontal axis, and the first focal length is different from the second focal length.

3. The headlamp of claim 1, wherein the projection optics include the anamorphic optical element, the anamorphic optical element has a first focal length along a vertical axis and a second focal length along a horizontal axis, and the first focal length is different from the second focal length.

4. The headlamp of claim 3, wherein the projection optics have a vertical and horizontal F-number in a range of about 1.2 to about 2.8.

5. The headlamp of claim 1, wherein the programmable spatial light modulator includes a digital micromirror device (DMD), a liquid crystal on silicon (LCoS) device, or a liquid crystal display (LCD).

6. The headlamp of claim 1, wherein the illumination module is configured to output the light beam with an aspect ratio greater than or equal to an aspect ratio of the programmable spatial light modulator.

7. The headlamp of claim 1, wherein the projection optics are configured to output the non-uniform patterned light with an aspect ratio greater than or equal to an aspect ratio of the programmable spatial light modulator.

8. The headlamp of claim 1, wherein the light beam includes white light, non-white light, or infrared light.

9. The headlamp of claim 1, wherein the non-uniform patterned light has a light intensity that is center peaked and, decreases monotonically away from a center of the non-uniform patterned light.

10. The headlamp of claim 1, wherein the illumination module is configured to output the light beam with an aspect ratio that approximates an aspect ratio of the programmable spatial light modulator.

11. The headlamp of claim 1, wherein the illumination module includes an LED, a laser, or an incandescent light.

12. The headlamp of claim 1, wherein the programmable spatial light modulator includes a digital micromirror device (DMD).

13. The headlamp of claim 12, wherein a tilt angle of the DMD is 12 degrees.

14. The headlamp of claim 12, wherein a tilt angle of the DMD is 17 degrees.

15. The headlamp of claim 1, wherein the programmable spatial light modulator is configured to output the non-uniform patterned light by reflecting the non-uniform illumination as the non-uniform patterned light.

16. The headlamp of claim 1, wherein the headlamp is an automotive headlamp.

17. A method of projecting light from a spatial light modulator, the method comprising:
receiving a light beam with an aspect ratio greater than an aspect ratio of the spatial light modulator;
outputting a non-uniform light beam with an aspect ratio that is approximately equal to the aspect ratio of the spatial light modulator;
receiving the non-uniform light beam at the spatial light modulator, pixelating the non-uniform light beam with the spatial light modulator, and reflecting the pixelated non-uniform light beam from the spatial light modulator;
receiving the reflected pixelated non-uniform light beam from the spatial light modulator into projection optics; and
outputting the reflected pixelated non-uniform light beam from the projection optics, wherein the outputted reflected pixelated non-uniform light beam has an aspect ratio greater than the aspect ratio of the spatial light modulator.

18. The method of claim 17, wherein pixelating the non-uniform light beam includes using patterns placed on pixel elements of the spatial light modulator to pattern the non-uniform light beam.

19. The method of claim 17, wherein outputting the non-uniform light beam includes operating at least one anamorphic optical element between a light source and the spatial light modulator to shape the non-uniform light beam.

20. The method of claim 17, wherein outputting the reflected pixelated non-uniform light beam from the projection optics includes operating at least one anamorphic optical element within the projection optics to shape the reflected pixelated non-uniform light beam.

* * * * *